3,707,583
ADHESIVE

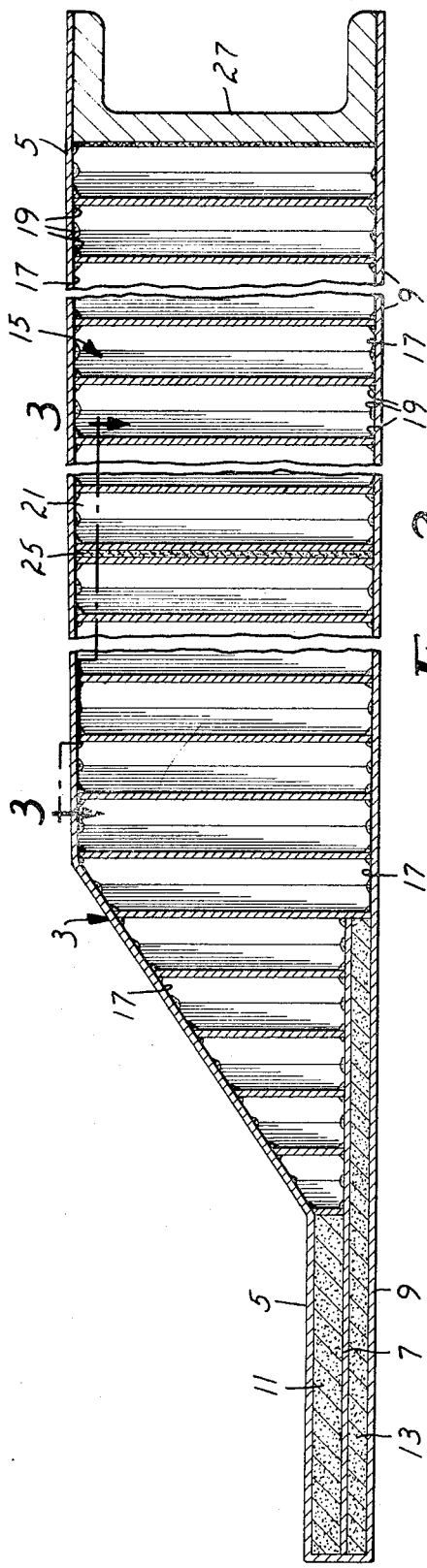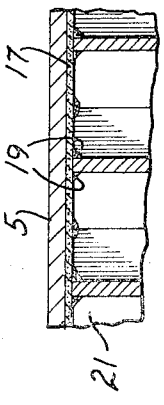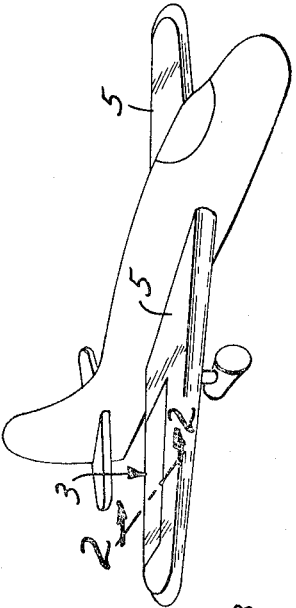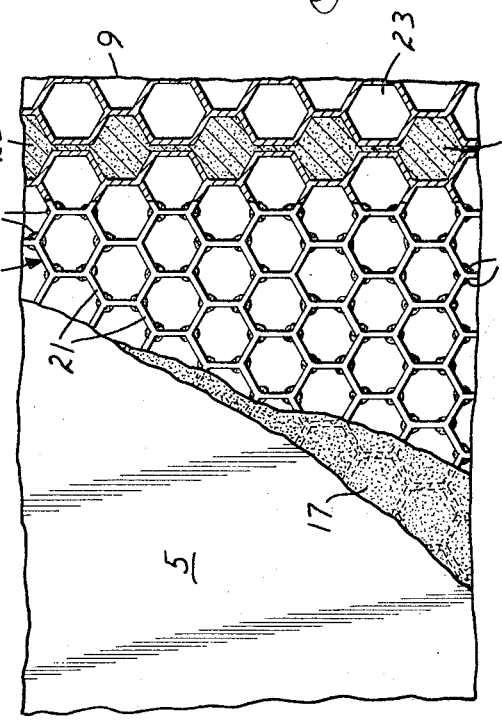
INVENTOR.
ALAN G. McKOWN
BY Kinney, Alexander,
Sell, Steldt & DeLaHunt
ATTORNEYS

Alan G. McKown, St. Paul, Minn., assignor to Minnesota Mining and Manufacturing Company, St. Paul, Minn.
Continuation-in-part of application Ser. No. 768,675, Oct. 18, 1968, now Patent No. 3,655,818. This application June 4, 1971, Ser. No. 150,026
The portion of the term of the patent subsequent to Apr. 11, 1989, has been disclaimed
Int. Cl. C08g 45/04
U.S. Cl. 260—837    14 Claims

ABSTRACT OF THE DISCLOSURE

A curable structural adhesive in flowable, particulate form comprising an epoxy resin in combination with a reaction product of a carboxylated nitrile rubber and an epoxy resin and an epoxy curing system which preferably will provide a cure at a temperature not exceeding about 250° F. Upon subjection to about 150° F., the adhesive converts to a state in which it will readily adhere to various substrates including metals. Also provided is a process for applying the adhesive to a substrate.

BACKGROUND OF THE INVENTION

This application is a continuation-in-part of copending application, Ser. No. 768,675, filed Oct. 18, 1968 now U.S. Patent No. 3,655,818.

This invention relates to structural adhesives; more particularly it relates to one-part, epoxy-based structural adhesives in flowable, particulate form especially adapted for adhering metal sheeting to itself and to honeycomb cores such as are employed in aircraft wing assemblies.

From a historical viewpoint, bonding of an airframe is a recent development. The first production usage of a bonded structure was in World War II bombers. The upsurge of commercial aviation in the post-war period started the trend away from riveted assemblies towards a bonded assembly. The reasons involved were numerous but included cleaner air foil surfaces, improved fatigue strength, and a greater strength to weight ratio through the use of honeycomb construction.

Initially, bonding was confined to control surface area and empennage but as improvements in adhesives were made, the use of adhesives expanded until today it includes a large percentage of the aircraft including wings, rotor blades and fuselage.

The development of film adhesives was a prime factor for this increase in usage as it offered adhesives in 100% solids form and permitted application of a controlled amount of adhesive. Other adhesives available were solvent solutions where drying was a major difficulty or 100% solids pastes which at least prior to the advent of films did not possess the fine balance of properties required for a structural adhesive. However, even with films various hand lay-up operations are required in making a bonded assembly including removing a protective liner, positioning the film, removing a second protective liner, making cutouts in desired areas, and finally closing the bond. In addition to involving undue amounts of time, film adhesives suffered from other drawbacks including waste in material from cutting operations, difficulty in applying to contoured surfaces, inability to provide adjustments in thickness, and limitations in compensating for mismatch of parts.

Adhesives in paste form are even less desirable due in part to their tackiness at the time of application making precise positioning of the bonded elements difficult, difficulty in controlling the amount and location of the adhesive, and the further fact that solvents are required to remove the adhesive from unwanted areas. Liquid solvent-containing structural adhesives also lacked suitability due to inability to localize application, the need for solvent removal with its attendant fire and toxicity hazards, and, as with the pastes, the tackiness of the adhesive at the time of application.

With the advent of the large jet aircraft, the amount of bonded area per plane and the total number of planes anticipated will far outstrip the production facilities and work force available. It is not considered economically sound to merely increase floor space and hire more labor. For the above reasons, the pesently available adhesives, both in terms of composition and form, do not lend themselves to the automated techniques which must be employed to meet this expanding demand.

To achieve a structural adhesive amenable to high production techniques and yet fulfill the stringent requirements of structural adhesives for aerospace environments is the primary object of this invention. These requirements are particularly formidable, calling for an adhesive which exhibits excellent strength properties over a wide temperature range which in turn depends on attainment of a delicate balance of such properties as adhesion, toughness, and tensile strength. The following table indicates the kind and value of properties over a wide temperature range desired in the bonds within such laminate structural members as are found in aircraft:

| Temperature of test, ° F | −67 | 75 | 180 | 250 |
|---|---|---|---|---|
| Overlap shear [1] (minimum in pounds/ square inch) | 3,500 | 3,500 | 2,000 | 750 |
| T-peel [2] (minimum in pounds/inch width) | 10 | 15 | 15 | |
| Honeycomb peel [3] (minimum in inch- pounds/inch width) | | | 10 | 10 |
| Beam-creep [4] (maximum in mils) | | | 50 | 50 |

[1] The free ends of strips of 1 inch wide, 4 inches long, 64 mil 2024 T3 clad aluminum alloy sheeting, bonded together at their other ends with 0.03 pounds/square foot weight of adhesive in a ½ inch overlapping joint, are pulled in opposite directions along their longitudinal axes.
[2] The adjacent ends of 1 inch wide, 8 inches long strips of 20 mil 2024 T3 clad aluminum alloy sheeting adhered together over most of their length (using 0.03 lbs./square foot weight of adhesive) are bent apart at right angles and are pulled in opposite directions.
[3] A free end of a 3 inch wide, 10 inch long, 20 mil 2024 T3 clad aluminum alloy sheeting is pulled from the ½ inch thick, ¼ inch cell honeycomb core of 4 mil 3003 aluminum alloy foil to which it is bonded (using 0.06 lbs./square foot weight of adhesive) by wrapping the sheeting around a 4 inch diameter roller riding on the surface of the sheeting.
[4] Three inches wide, 8 inches long sections of the described honeycomb core are laminated between 64 mil skins of 2024 T3 clad aluminum alloy sheeting (using 0.06 lbs./square foot weights of adhesive) and the laminate are supported by supports spaced 6 inches apart. A 1,000 pound weight at 75° F. and an 800 pound weight at 180° F. are loaded midway between the supports. After 192 hours the deformation of the center of the beam is measured.

The achievement of such properties when bonding to honeycomb requires an adhesive that not only exhibits strength properties in the cured state, but that also, when first heated, has flow and other characteristics necessary to wet and form a fillet along the contacted edge portion of the honeycomb. Moreover, the presence of aluminum as the substrate in the majority of aerospace structures to be bonded necessitates imposition of a limitation in the curing temperature of the adhesive in order to avoid reduction in corrosion and fatigue resistance of the aluminum. As a consequence, curing temperatures not exceeding about 250° F. are highly desirable and in some cases necessary.

The present invention provides a structural adhesive possessing the above stated properties as well as being amenable to automated techniques of application, such structural adhesive being a flowable particulate comprising:

(a) A first epoxy resin having on the average more than one reactive 1,2 epoxy group per molecule,
(b) A reaction product of a second epoxy resin and a nitrile rubber copolymer derived from 18–46% by weight acrylonitrile, 54–82% by weight butadiene, and up to 15% by weight of a carboxylic acid, said second epoxy resin having on the average more than one reactive 1,2 epoxy group per molecule, there being sufficient molecules of the reaction product having a molecular weight of at least 8000 to account for at least about 10% of the weight of the composition, and (c) A room temperature stable curing agent active at elevated temperatures;

wherein the weight of the nitrile rubber copolymer is less than about 55% of the combined weight of the first and second epoxy resins. The first and second epoxy resins as recited above may be of the same or different composition in the practice of this invention. The composition may additionally include a further nitrile rubber copolymer which is not combined with epoxy resin in the form of a reaction product.

In my copending application Ser. No. 768,675, there is described a flowable, particulate structural adhesive which is also quite useful for the aircraft industry. It has been found, however, that the utilization of a reaction product of epoxy resin and carboxylated nitrile rubber in combination with a further epoxy resin produces adhesives which are superior to those obtained when the reaction product is not used. Specifically, the adhesives of the present invention have longer shelf stability and exhibit a more desirable balance of properties throughout the temperature range of −67° F. to 250° F. than is obtainable with the adhesives of my above-mentioned copending application.

The adhesives of the present invention, in particulate form, may be applied by various automatic means including rollers, electrostatic spray equipment, fluidized beds, and vibrating beds. In the completely uncured state, the adhesive is a flowable particulate which can be readily removed from undesired areas by means of a vacuum tool. Upon subjection to temperatures above about 120° F. and below the cure temperature, the adhesive enters an agglomerated, fused state in which it adheres strongly to the substrate to which it is applied and yet is not tacky or sticky enough to cause individually treated substrates to stick together during storage or shipment. Moreover, in this state, the treated parts can be manipulated into the bonding position without the need for careful precautions to insure precise initial matching. The adhesive can remain in this fused adherable, non-tacky, curable state for extended periods of time at temperatures less than about 90° F.

Because of this stability in an adherable state, it is now possible for the manufacturer of the basic structural elements, e.g., the manufacturer of panels and honeycomb structures, to pre-coat such elements with the adhesive, selectively remove adhesive from undesired areas, heat the adhesive to a fused, adhering state, and ship the resulting product to the ultimate fabricator such as the airplane manufacturer. Thus, the adhesive of this invention provides the opportunity for a form of marketing of structural units hitherto impossible with previous structural adhesives, giving the ultimate manufacturer the option of concentrating on the final assembling techniques to which it is best suited.

Epoxy resins suitable in the practice of this invention are thermosettable polyethers having on the average more than one 1,2 epoxy group per molecule, including the diglycidyl ethers of polyhydric phenols, glycidyl ethers of novolac resins, glycidyl ethers of aliphatic poyols, and glycidyl ethers containing nitrogen. Preferred diglycidyl ethers of polyhydric phenols include the condensation product of epichlorohydrin and Bisphenol A.

Exemplary commercially available Bisphenol A type solid epoxy resins are sold under the trade designations Epon 1002 (a solid diglycidyl ether of Bisphenol A, epoxy equivalent weight 600–700) and DER 662 (a solid diglycidyl ether-bisphenol-A resin, epoxy equivalent weight 575–700). Other useful solid epoxy resins of the diglycidyl ether-Bisphenol A type include Epon 840 (epoxy equivalent weight 330–380, softening point 55–68° C.), Epon 1001 (epoxy equivalent weight 450–550, softening point 65–74° C.), Epon 1004 (epoxy equivalent weight 875–1000, softening point 125–135° C.). Useful liquid epoxy resins of the diglycidyl ether-Bisphenol A type, which are useful when blended with solid epoxy resins, include Epon 834 (epoxy equivalent weight 230–280) and ERL 2774 (epoxy equivalent weight 180–195).

The glycidyl ethers of novolac resins are characterized by phenyl groups linked by methylene bridges with epoxy groups pendent to the phenyl groups, commercially available resins being sold under the trade designation DEN–438 (a polyglycidyl ether of phenol-formaldehyde novolac, epoxy equivalent weight 176–181) and ECN–1280 (a polyglycidyl ether of orthocresol-formaldehyde novolac, epoxy equivalent weight 230). Commercially available glycidyl ethers of aliphatic polyols include those having the trade designations ERL–4201 (3,4-epoxy-6-methylcyclohexylmethyl 3,4-epoxy-6-methylcyclohexane carboxylate, epoxy equivalent weight 145–156) and ERL–4289 (bis(3,4-epoxy-6-methyl-cyclohexylmethyl)adipate, epoxy equivalent weight 220). A commercially available glycidyl ether containing nitrogen is ERL 0510 (triglycidyl para-aminophenol, epoxy equivalent weight 97–101).

For the preparation of the reaction product the epoxy resin can be either liquid, solid, or a blend of liquid and solid resins. When only liquid epoxy resins are used in the formation of the reaction product, it is normally necessary to blend one or more solid epoxy resins with the reaction product so long as the overall adhesive composition constitutes a grindable mass, at least in the presence of Dry Ice, which will provide a powdered adhesive at room temperature. Conversely, when the reaction product is a solid, some amount of uncombined liquid epoxy resin can be blended therewith so long as the overall composition can be ground to a powder. Some agglomeration of adhesive may occur at room temperature but the adhesive should be capable of being broken up into matter having particulate character. It is preferred that at least some (e.g., 5 weight percent) novolac epoxy resin be present, in either the reaction product or in an uncombined state, to provide high temperature strength to the adhesive.

The nitrile rubber—copolymers of butadiene and acrylonitrile—serves as a modifier for the epoxy resins. The nitrile rubber contains a small percentage of carboxyl groups either terminally located or distributed throughout the polymer chain or both. Nitrile rubbers derived from 18–46% acrylonitrile, 54–82% butadiene, and up to 15% of a carboxylic acid, represent typical formulations suitable in the practice of this invention. Commercially available nitrile rubbers include those sold under the trade designations Hycar 1072 (a carboxylated acrylonitrile/butadiene copolymer, solid at room temperature, having a number average molecular weight of about 30,000 and comprising about 5% acrylic acid, 35% acrylonitrile and 60% butadiene), Chemigum 550 (a carboxylated acrylonitrile/butadiene copolymer), Tylac 221A and Tylac 211A (Carboxylated butadiene/ acrylonitrile rubbers having about 25% acrylonitrile and 5–10% carboxylic acid comonomer), and Hycar CTBNX (a liquid carboxylated acrylonitrile/butadiene copolymer having a number average molecular weight of 3600, the copolymer including about 20 weight percent acrylonitrile and 0.07 acid-equivalents per 100 grams of material).

The curing system for the adhesive should be latent at room temperature so as to permit storage of the adhesive in particulate form for extended periods of time. Preferable, the curing system includes at least one room temperature stable, nitrogen-containing compound which is decomposable at elevated temperatures to provide at least one active hydrogen-containing amine. Decomposition preferably occurs at a temperature between 180° F. and 250° F. to provide curing in that temperature range generally within a period of one hour. For certain applications, especially for bonding aluminum substrates in aerospace structures, curing temperatures not exceeding 250° F. are desired. For these purposes preferred curing systems include 3-(p-chlorophenyl)-1,1-dimethyl urea, and 2,4-bis(N,N-dimethyl carbamide) toluene. For other substrates, curing systems providing a cure at 350° F. are suitable, e.g., dicyandiamide provides a 325–350° F./ one hour cure. For optimum adhesive strength properties, it is preferred to use a curing system comprising both dicyandiamide and a substituted urea.

Exemplary decomposable curing agents include mono- and poly-urea, thioureas, and hydrazides (e.g., as described in U.S. Pat. No. 2,847,395) illustrative of which are the following:

3-phenyl-1,1-dimethyl urea;
3-(p-chlorophenyl)-1,1-dimethyl urea;
3-p-anisyl-1,1-dimethyl urea;
3-p-nitrophenyl-1,1-dimethyl urea;
3-phenyl-1,1-cyclopentamethylene urea;
3-phenyl-1,1-cyclohexamethylene urea;
N-(3,4-dichlorophenyl)-N',N'-dimethyl urea;
3-phenyl-1,1-dibutyl urea;
3-phenyl-1-benzyl-1-methyl urea;
trimethylurea;
3-phenyl-1,1-dimethylene urea;
3-cyclohexyl-1,1-dimethyl urea;
2,4-bis(N,N-dimethyl carbamide) toluene;
N',N'-dimethyl-1,3-propane diamine dicarboxanilide;
1,3-dicyclohexyl urea;
1,3-dimethylol urea;
1,3-diethyl thiourea;
thiourea;
urea;
3-phenyl-1,1-dimethyl thiourea;
semicarbazide;
thiosemicarbazide;
4-phenyl-1,1-dimethyl semicarbazide;
4-phenyl-1,1-dimethyl thiosemicarbazide;
1-cyanoguanidine;
1,3-diphenyl guanidine; and
1,1'-(4-methyl-m-phenylene)-bis-[3,3'-dimethylurea].

In addition to the room-temperature stable, elevated-temperature-decomposable nitrogen-containing compound, the curing system may further contain a hydroxy-containing organic compound and an organo-lead or mercury compound. Such a three-component curing system is disclosed in U.S. Pat. No. 3,562,215 (issued to Moore). This curing system further reduces the cure temperature of the adhesive from about 250° F. to a temperature generally below 200° F.

The hydroxyl containing compound may be an aliphatic, alicyclic, or aromatic alcohol, carboxylic acid, hydroxy acid, or mixture thereof. Such compounds may contain one or a plurality of hydroxy or carboxyl groups. Aliphatic polyhydroxy compounds are preferred, especially ethylene glycol and glycerol. Representative hydroxyl containing compounds are the following: ethylene glycol, glycerol, triethylene glycol, bisphenol A, methanol, n-butanol, phenol, o-cresol, m-cresol, p-cresol, resorcinol, o-bromophenol, n-hexanol, trichloracetic acid, and mixtures thereof.

Exemplary organo-mercury and organo-lead compounds are phenyl mercuric hydroxide, phenyl mercuric acetate, phenyl mercuric stearate, lead octoate, lead linoleate, and lead acetate. The organo-mercury and organo-lead compounds, in combination with the nitrogen containing compound and the above described hydroxyl containing compounds, provide an unexpectedly rapid curing system for epoxy resins.

When employing the three component curing system, a major amount of the nitrogen-containing component and minor amounts of each of the other two components are generally employed. However, this could be reversed so that either of the hydroxyl containing or organo-metallic compound is in the majority. An excess of any of the three ingredients is not detrimental to the adhesive; it will merely serve as a filler. A suitable composition of the three component cure system is one containing about 0.025 to about 500, preferably about 1 to about 25, parts of nitrogen-containing compound per part of hydroxyl containing compound, and about 0.05 to about 5000, preferably about 1 to about 250, parts of nitrogen-containing compound per part of organo-metallic compound. Here, as elsewhere in the specification and claims, parts are by weight unless stated to the contrary.

In addition to the foregoing, the adhesive composition of this invention may include fillers and the like. Particularly desirable is a finely divided inorganic oxide such as titanium dioxide which has been found to promote sprayability in electrostatic equipment. Other suitable inorganic oxides are aluminum oxide ($Al_2O_3$) and calcium oxide (CaO). Another highly desirable component for inclusion in the adhesive of this invention is a corrosion inhibitive pigment such as a metal chromate (zinc, cadmium, calcium, strontium, lead, barium).

The substrates to be bonded may be treated with any of a broad variety of adhesion promoting primers or conversion coatings to improve the bond strengths and/or durability of the adhesive, as is well known to the art.

The amount of the various components of the adhesive composition of this invention may vary over rather broad ranges. The total amount of nitrile rubber which may suitably be present is less than about 55% of the combined weight of all epoxy resin present in the composition. It is not necessary for all of the nitrile rubber in the adhesive composition to be combined with epoxy resin in the form of a reaction product. That is, some of the nitrile rubber can be present in uncombined or unreacted form. Ordinarily, for shelf stability reasons, the amount of uncombined nitrile rubber present should not exceed about 9% by weight of the combined weight of all epoxy resin present in the composition and, preferably, the amount of uncombined nitrile rubber should not exceed 6% of the weight of the total epoxy resin present. When extended shelf stability is not required, the amount of uncombined nitrile rubber can be quite high, e.g., 30–40% or more.

The curing system may suitably be present in an amount of at least 0.15, and preferably at least 0.8, amine hydrogen equivalents per epoxy equivalent. Higher levels of curing agents are not detrimental as they serve merely as fillers, albeit expensive ones. The metal oxide and the corrosion inhibitive pigment may each be present to the extent of from 0 to about 36 parts by weight per 100 parts by weight of epoxy resin.

Spraying, fluidized beds, and vibrating beds represent automated techniques for applying the adhesive of this invention to the substrate to be bonded. Because of the powdery nature of the adhesive, it can be readily removed by vacuum tools where desired. One method comprises contacting a supply of powdered adhesive with a honeycomb core structure which is at a temperature sufficiently high to cause the adhesive to transfer to the core edges (about 150° F.) and yet insufficient to activate the elevated temperature decomposable curing agent, removing the adhesive coated core from the supply and, cooling the core structure such that the adhesive assumes a fused, non-tacky, adhering state.

The supply of powdered adhesive contacted by the heated core may suitably be in the form of a flat bed or coating on a roller. Adhesion of the powder to the roll surface can be maintained by electrostatic forces, vacuum forces, friction such as found in a pile type fabric, or the force of attraction which the roll surface inherently possesses with respect to the powdered adhesive.

A typical honey comb assembly to be bonded by the adhesive of this invention is illustrated in FIGS. 1–4 wherein:

FIG. 1 illustrates an airplane in which structural members are bonded with the adhesive of this invention;

FIG. 2 is a cross-sectional view of the wing assembly taken along line 2—2;

FIG. 3 is a sectional view taken along line 3—3 of FIG. 2; and

FIG. 4 is an enlarged fragmentary view of the bonded area of the honeycomb core of FIG. 2.

Referring to FIGS. 1–4, section 1 of a wing assembly 3 is shown. The section 1 comprises a doubler portion consisting of aluminum panels 5, 7, and 9 bonded by adhesive layers 11 and 13. The honeycomb core 15 is bonded to the outer aluminum panels or skins 5 and 9 by means of an adhesive layer 17 and filleting adhesive 19 (see FIGS. 3 and 4). The adhesive layer 17 and filleting hesive 19 may be of the same or different compositions falling within the scope of the present invention. Preferably, adhesive layer 17 contains a corrosion inhibitive pigment. As particularly shown in FIGS. 3 and 4, the filleting adhesive occurs substantially exclusively along the edges 21 of the honeycomb cells leaving the intra-cellular portion 23 open. Core sections are spliced together by means of an expandable adhesive 25 which may be in the form of a tape or other suitable form. The channel closeout portion 27 is also joined to the honeycomb core by means of an expandable adhesive 25.

To further illustrate the invention, the following non-limiting examples are provided in which all parts and percentages are by weight unless otherwise expressed.

EXAMPLE 1

A suitable reaction product was prepared with the following ingredients:

| Ingredients: | Parts by weight |
| --- | --- |
| Epon 1004 | 89 |
| Hycar CTBNX | 20.3 |

The Epon 1004 was placed in a reactor fitted with a stirrer, thermometer, and heating mantel and heated with stirring to 350° F. Then the Hycar CTBNX was added. The mixture was heated again to 350° F. and held at that temperature and stirred for 3 hours. During this reaction the acid number of the mixture was reduced to zero, indicating complete reaction of the nitrile rubber (Hycar CTBNX) with epoxy resin.

The resulting reaction kettle contents (reaction products plus free epoxy resin) were poured from the reactor as a hot liquid (about 200° F.) and then were cooled to room temperature where it was broken into chunks or bars.

The following materials were then blended on a conventional rubber mill:

| Material: | Parts by weight |
| --- | --- |
| Hycar 1072 (nitrile slab rubber) | 6.7 |
| Reaction kettle contents | 109.3 |
| ERL 0510 (epoxy) | 11 |
| Titanium dioxide | 27 |
| Strontium chromate | 9 |
| Dicyandiamide | 3.1 |
| 2,4-bis(N,N-dimethyl carbamide)toluene | 6.2 |

The nitrile rubber was banded on a conventional rubber mill after which the reaction kettle contents and further epoxy resin were added. The mixture was blended to a homogeneous mass at a temperature below about 200° F. In successive order, the titanium dioxide, strontium chromate, dicyandiamide, and 2,4-bis(N,N-dimethyl carbamide)toluene were added. During addition of the latter ingredients, the rubber mill was cooled with circulating water to prevent heat build-up. After uniform mixing was obtained, the adhesive formulation was removed from the mill and cooled. The adhesive was then ground with Dry Ice in a hammer mill to produce a particle size which would pass through a 60 mesh screen. The resulting powdered adhesive can be stored indefinitely at 40° F. and it can be cured at 250° F./1 hour.

The adhesive of Example 1, after testing in accordance with the procedures described above at page 4, exhibited the properties shown in Table I below.

TABLE I

| | Overlap shear | T-peel | Honey-comb peel |
| --- | --- | --- | --- |
| −67° F. | 4,560 | 17 | 11 |
| 75° F. | 5,200 | 50 | 15 |
| 180° F. | 4,000 | 39 | 10 |
| 250° F. | 1,720 | 21 | |

When preparing the reaction product, it is preferable to include a large molar excess of the epoxy resin in the reaction kettle with thed esired amount of nitrile rubber copolymer so that undesirable cross-linking of the resulting reaction product does not occur. Thus, it is possible to include all of the epoxy resin in the reaction kettle with all of the nitrile rubber copolymer when forming the reaction product. The excess epoxy resin remains in the uncombined state while the reaction product is formed. All of the nitrile rubber copolymer in the reaction kettle is combined with epoxy resin to form the reaction product.

In each of the examples in this specification a large molar excess of epoxy resin was included in the reaction kettle during the formation of the reaction product. The entire reaction kettle contents are then blended, on a conventional rubber mill, with the remaining adhesive ingredients to form the adhesive compositions of the invention. Normally it is preferred to use at least a 5:1 molar excess of epoxy resin:nitrile rubber in the reaction kettle for the formation of the reaction product, although a molar excess of 3:1 is also useful. The molar excess can, of course, be very great (e.g., 10:1, 20:1, or even 45:1).

It has been found that the adhesives of the present invention exhibit optimum structural adhesive properties when at least about 10 weight percent, and preferably at least 15 weight percent, of the adhesive composition is composed of either: (a) reaction product molecules having a molecular weight of at least 8000; or (b) reaction product molecules and uncombined nitrile rubber copolymer molecules, each type of molecule having a molecular weight of at least 8000. However, for shelf stability reasons, the amount of uncombined nitrile rubber copolymer present should not exceed about 9% of the weight of the total amount of epoxy resin in the composition.

When all of the nitrile rubber is present in the composition in the form of reaction product molecules (i.e., combined with epoxy), it is desirable to use at least 5, and preferably 10, parts of nitrile rubber for each 100 parts of epoxy resin so long as there are sufficient reaction product molecules having a molecular weight of at least about 8000 to account for at least about 10% of the composition weight.

Some amount of free or uncombined epoxy resin which liquefies or softens at elevated temperatures is included in the composition so as to insure, during curing, wetting of the substrate by the adhesive. The free epoxy resin also promotes the rate of cure and improves the modulus of the cured adhesive product, particularly with respect to elevated temperature properties. The amount of free or uncombined epoxy resin which can be present in the composition can vary over a broad range, the important point being that sufficient reaction product molecules having a molecular weight of at least 8000 to account for at least about 10% of the weight of the composition must be present. Normally, the uncombined epoxy resin represents the major amount of total epoxy resin present in the composition.

The weight of reaction product molecules having a molecular weight of at least 8000 was determined with a gel permeation chromatograph (GPC), using the procedure described in commonly assigned application Ser. No. 873,132. With each of those adhesive compositions described in the present specification, it was found that at least 10% by weight of the composition constituted (a) reaction product molecules having a molecular weight of at least 8000, or (b) reaction product molecules and uncombined nitrile rubber copolymer molecules, each type of molecule being over 8000 molecular weight.

EXAMPLE 2

According to the procedure of Example 1, a reaction product was prepared after charging the following materials to a reaction kettle.

| Ingredients: | Parts by weight |
|---|---|
| Epon 1004 | 89 |
| Hycar CTBNX | 27 |

An adhesive composition was then prepared with the following materials, according to the procedure of Example 1.

| Material | Parts by weight |
|---|---|
| Hycar 1072 (nitrile slab rubber) | 9 |
| Reaction kettle contents | 116 |
| ERL 0510 (epoxy) | 11 |
| Titanium dioxide | 9 |
| Strontium chromate | 27 |
| Dicyandiamide | 1.4 |
| 2,4-bis(N,N-dimethyl carbamide)toluene | 2.8 |

The resulting adhesive exhibited the properties shown below in Table II.

TABLE II

| | Overlap shear | T-peel | Honey-comb peel |
|---|---|---|---|
| −67° F | 4,240 | 23 | 19 |
| 75° F | 4,617 | 55 | 30 |
| 180° F | 2,573 | 26 | 21 |
| 250° F | 1,490 | 7 | |

The adhesive of Example 2, containing more nitrile rubber copolymer than the adhesive of Example 1, exhibits more desirable honeycomb peel strength, at the expense of high temperature T-peel and overlap shear strength, than the adhesive of Example 1.

EXAMPLE 3

An adhesive composition exhibiting a desirable balance of structural adhesive properties was prepared as follows:

The reaction product was prepared according to the method of Example 1 with the following ingredients:

| Ingredients: | Parts by weight |
|---|---|
| Epon 1004 | 50 |
| Epon 840 | 20 |
| ERL 0510 | 15 |
| Hycar CTBNX | 25 |

The following materials were mixed according to the method described in Example 1.

| Material: | Parts by weight |
|---|---|
| Reaction kettle contents | 110 |
| Epon 1002 | 10 |
| ECN 1280 | 5 |
| Titanium dioxide | 11.25 |
| Strontium chromate | 11.25 |
| Dicyandiamide | 3 |
| 2,4-bis(N,N-dimethyl carbamide)toluene | 6 |

The resulting adhesive exhibited the properties shown in Table III.

TABLE III

| | Overlap shear | T-peel | Honey-comb peel |
|---|---|---|---|
| 670° F | 5,365 | 20 | |
| 75° F | 5,410 | 29 | 21 |
| 180° F | 4,004 | 21 | 18 |
| 250° F | 1,735 | 14 | |

EXAMPLE 4

According to the procedure of Example 1, a reaction product was prepared using the following ingredients:

| Ingredients: | Parts by weight |
|---|---|
| Epon 1004 | 50 |
| Epon 840 | 20 |
| ERL 0510 | 15 |
| Hycar CTBNX | 20 |

The following materials were mixed according to the method of Example 1.

| Material: | Parts by weight |
|---|---|
| Tylac 221A | 5 |
| Reaction kettle contents | 105 |
| Epon 1002 | 10 |
| ECN 1280 | 5 |
| Titanium dioxide | 11.25 |
| Strontium chromate | 11.25 |
| Dicyandiamide | 3 |
| 2,4-bis(N,N-dimethyl carbamide)toluene | 6 |

The resulting adhesive exhibited the properties shown in Table IV.

TABLE IV

| | Overlap shear | T-peel | Honey-comb peel |
|---|---|---|---|
| −67° F | 4,400 | 19 | 6 |
| 75° F | 5,800 | 27 | 24 |
| 180° F | 4,100 | 23 | 22 |
| 250° F | 1,800 | 13 | |

In Examples 5 and 6 all of the epoxy resin in the adhesive composition was included in the reaction kettle during the formation of the reaction product.

EXAMPLE 5

| Reaction kettle ingredients: | Parts by weight |
|---|---|
| Epon 1004 | 89 |
| ERL 0510 | 11 |
| Hycar CTBNX | 20.3 |

After heating for 3 hours at 350° F. the resulting reaction product and uncombined epoxy resin were blended on a conventional rubber mill with the following materials:

| Ingredients | Parts by weight |
|---|---|
| Hycar 1072 | 6.7 |
| Titanium dioxide | 9 |
| Strontium chromate | 27 |
| Dicyandiamide | 4.2 |
| 2,4-bis(N,N-dimethyl carbamide)toluene | 2.8 |

EXAMPLE 6

| Reaction kettle ingredients | Parts by weight |
|---|---|
| Epon 1004 | 89 |
| ERL 0510 | 11 |
| Hycar CTBNX | 20.3 |

After heating for 3 hours at 350° F., the resulting reaction product and uncombined epoxy resin were blended on a conventional rubber mill with the following materials:

| Ingredients | Parts by weight |
|---|---|
| Hycar 1072 | 6.7 |
| Titanium dioxide | 6.7 |
| Strontium chromate | 2.3 |
| Dicyandiamide | 1.4 |
| 2,4-bis(N,N-dimethyl carbamide)toluene | 2.8 |

The adhesive compositions of Examples 5 and 6 exhibited the properties shown in Table V.

TABLE V

| Example | °F. | Overlap shear | T-peel | Honeycomb peel |
|---|---|---|---|---|
| 5 | −67 | 4,553 | 14 | 6 |
|   | 75 | 5,700 | 39 | 12 |
|   | 180 | 4,117 | 34 | 10 |
|   | 250 | 1,540 | 12 |  |
| 6 | −67 | 5,827 | 44 | 38 |
|   | 75 | 5,600 | 36 | 48 |
|   | 180 | 3,433 | 28 | 20 |
|   | 250 | 1,313 | 9 |  |

The adhesives of Example 1–6 meet all of the minimum requirements for a structural adhesive, as set forth above at page 3.

In the preparation of the reaction product one can use either liquid or solid nitrile rubber copolymers. When using solid nitrile rubber for this purpose it is initially dissolved in a solvent such as methyl ethyl ketone, acetone or toluene and the formation of the reaction product can be carried out at various temperatures.

The powdered adhesive is applied to at least one of the two elements to be bonded by one of the following methods:

(1) Electrostatic spraying.—Employing an electrostatic spray gun such as a Ransburg REP hand gun, the powdered adhesive is electrostatically charged while passing through the gun. The powdered, electrostatically charged adhesive issuing from the gun is applied to an electrically grounded metal sheet or honeycomb by electrostatic attraction. Excess adhesive is removed by brushing or suction using a vacuum tool. The adhesive is then fused to the metal surface by heating at 120° F. for 10 minutes in an air circulating oven. At this stage, the adhesive is firmly adhered to the surface in a non-tacky, uncured state. The parts to be bonded are then assembled and the adhesive cured by subjecting the assemblage to a temperature of 250° F. and a pressure of 50 p.s.i. for 60 minutes in an autoclave.

(2) Fluidized bed.—The metal substrate such as a honeycomb core is preheated to 150° F. and then dipped into a fluidized bed of the above adhesive. The adhesive fuses to the core edges, with the intra-cellular area being free of adhesive. The desired assemblage is completed and the adhesive cured as above.

(3) Powder bed. The metal substrate is preheated to 150° F. and then brought into contact with a pile fabric surfaced roller bearing a layer of loosely adhering powder. The heat fuses the adhesive particles to the substrate. Assembling and curing are accomplished as above.

While the present invention has been particularly described with respect to aluminum substrates employed in aerospace structures, it is to be understood that the adhesive of this invention finds application to a variety of other substrates such as wood, steel, plastics and the like.

What is claimed is:

1. A solid, flowable, particulate, curable adhesive composition comprising:
    (a) a first epoxy resin having on the average more than one reactive 1,2 epoxy group per molecule,
    (b) a reaction product of a second epoxy resin and a nitrile rubber copolymer derived from 18–46% by weight acrylonitrile, 54–82% by weight butadiene, and up to 15% by weight of a carboxylic acid, said second epoxy resin having on the average more than one reactive 1,2 epoxy group per molecule, there being sufficient molecules of said reaction product having a molecular weight of at least 8000 to account for at least about 10% of the weight of said composition, and
    (c) an epoxy curing system present in an amount of at least 0.15 amine hydrogen equivalents per epoxy equivalent comprising at least one room temperature stable, nitrogen-containing compound decomposable below 250° F. to provide at least one active hydrogen-containing amine, wherein the weight of said nitrile rubber copolymer is less than about 55% of the combined weight of said first and second epoxy resins.

2. An adhesive in accordance with claim 1, wherein said curing agent comprises dicyandiamide.

3. An adhesive in accordance with claim 1, wherein said curing agent comprises at least one room temperature stable urea compound decomposable below 250° F. to provide at least one active-hydrogen-containing amine.

4. An adhesive in accordance with claim 3, wherein said curing agent further comprises dicyandiamide.

5. An adhesive in accordance with claim 1, wherein said first epoxy resin comprises a condensation product of a polyhydric phenol and an epihalohydrin.

6. An adhesive in accordance with claim 1, wherein said second epoxy resin comprises a novolac epoxy resin.

7. A solid, flowable, particulate, curable adhesive composition comprising:
    (a) a first epoxy resin having on the average more than one reactive 1,2 epoxy group per molecule,
    (b) a reaction product of a second epoxy resin and a first nitrile rubber copolymer derived from 18–46% by weight acrylonitrile, 54–82% by weight butadiene, and up to 15% by weight of a carboxylic acid, said second epoxy resin having on the average more than one reactive 1,2 epoxy group per molecule,
    (c) a second nitrile rubber copolymer derived from 18–46% by weight acrylonitrile, 54–82% by weight butadiene, and up to 15% by weight of a carboxylic acid, said second copolymer being present in an amount not exceeding 9% by weight of the combined weight of said first and second epoxy resins, and
    (d) an epoxy curing system present in an amount of at least 0.15 amine hydrogen equivalents per epoxy equivalent comprising at least one room temperature stable, nitrogen-containing compound decomposable below 250° F. to provide at least one active hydrogen-containing amine;

wherein the combined weight of the molecules of said reaction product and the molecules of said second nitrile rubber copolymer which are of at least 8000 molecular weight constitute at least 10% of the weight of said composition; and wherein the combined weight of said first and second nitrile rubber copolymers is less than 55% of the combined weight of said first and second epoxy resins.

8. An adhesive in accordance with claim 7, wherein said second nitrile rubber copolymer is present in an amount less than 6% by weight of the combined weight of said first and second epoxy resins.

9. An adhesive in accordance with claim 7, wherein said curing agent comprises dicyandiamide.

10. An adhesive in accordance with claim 7, wherein said curing agent comprises at least one room temperature stable urea compound decomposable below 250° F. to provide at least one active-hydrogen-containing amine.

11. An adhesive in accordance with claim 10, wherein said curing agent further comprises dicyandiamide.

12. An adhesive in accordance with claim 7, wherein the weight of said second nitrile rubber copolymer is 5% of the combined weight of said first and second epoxy resins, and wherein the weight of said first nitrile rubber copolymer is 20% of the combined weight of said first and second epoxy resins.

13. A process for the application of a powdered adhesive to a metallic honeycomb structure comprising heating said metallic honeycomb structure to a temperature above room temperature and below the curing temperature of said adhesive, contacting the cellular surface of said heated honeycomb structure with a supply of the adhesive of claim 1, and removing said honeycomb structure from said supply whereby said adhesive selectively transfers substantially exclusively to the cellular edges of said honeycomb structure where said adhesive assumes a fused, non-tacky, curable, adhering state.

14. A process for the application of a powdered adhesive to a substrate comprising electrostatically charging the adhesive of claim 1, spraying said electrostatically charged adhesive on said substrate, and heating said substrate to a temperature sufficiently high to cause said adhesive to adhere to said substrate but not high enough to cause curing of said adhesive.

References Cited

UNITED STATES PATENTS

| | | | |
|---|---|---|---|
| 2,879,252 | 3/1959 | Reon | 260—837 |
| 2,947,338 | 8/1960 | Reid | 260—836 |
| 3,100,160 | 8/1963 | Korpman | 260—837 |
| 3,208,980 | 9/1965 | Gruver | 260—836 |
| 3,219,515 | 11/1965 | Rice | 260—836 |
| 3,312,754 | 4/1967 | Marks | 260—837 |
| 3,324,198 | 6/1967 | Gruver | 260—837 |
| 2,713,569 | 7/1955 | Greenlee | 260—47 |
| 3,386,955 | 6/1968 | Nawakowski | 260—47 |
| 3,639,500 | 2/1972 | Muny | 260—837 |

FOREIGN PATENTS

| | | | |
|---|---|---|---|
| 999,383 | 7/1965 | Great Britain | 260—836 |

PAUL LIEBERMAN, Primary Examiner

U.S. Cl. X.R.

117—17, 37 R, 93.4 R, 132 BE, 132 CB, 138.8 A, 148; 161—28; 260—2 EC, 2 N, 37 EP, 41.5 E, 47 EC, 47 EN, 830 TW 836